(12) United States Patent
Lee et al.

(10) Patent No.: US 9,705,657 B2
(45) Date of Patent: Jul. 11, 2017

(54) METHOD AND APPARATUS FOR SCHEDULING IN WIRELESS COMMUNICATION SYSTEM FOR COORDINATED SCHEDULING

(71) Applicant: KT CORPORATION, Gyeonggi-do (KR)

(72) Inventors: Ki-Ho Lee, Gyeonggi-do (KR); Yong-Gyoo Lee, Seoul (KR); Yung-Ha Ji, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 135 days.

(21) Appl. No.: 14/378,630

(22) PCT Filed: Nov. 2, 2012

(86) PCT No.: PCT/KR2012/009196
§ 371 (c)(1),
(2) Date: Aug. 13, 2014

(87) PCT Pub. No.: WO2013/122306
PCT Pub. Date: Aug. 22, 2013

(65) Prior Publication Data
US 2015/0003426 A1    Jan. 1, 2015

(30) Foreign Application Priority Data

Feb. 14, 2012 (KR) .................. 10-2012-0015028
May 8, 2012 (KR) .................. 10-2012-0048809

(51) Int. Cl.
*H04L 5/00* (2006.01)
*H04W 72/12* (2009.01)

(52) U.S. Cl.
CPC ....... *H04L 5/0073* (2013.01); *H04W 72/1226* (2013.01); *H04L 5/0037* (2013.01); *H04L 5/0046* (2013.01); *H04L 5/0069* (2013.01)

(58) Field of Classification Search
CPC .. H04W 72/1226; H04W 36/30; H04L 5/005; H04L 5/0033; H04L 5/0073
See application file for complete search history.

(56) References Cited

U.S. PATENT DOCUMENTS

2002/0061751 A1*  5/2002  Zhao ............... H04W 36/18
                                                   455/442
2009/0052392 A1*  2/2009  Sumasu ............ H04W 36/02
                                                   370/331
(Continued)

FOREIGN PATENT DOCUMENTS

KR    10-2008-0073813 A    8/2008
KR    10-2010-0091326 A    8/2010
(Continued)

*Primary Examiner* — Anez Ebrahim
(74) *Attorney, Agent, or Firm* — IP Legal Services, LLC

(57) ABSTRACT

A method and apparatus for scheduling in a wireless communication system configured for coordinated scheduling are disclosed.

The scheduling apparatus sets a gain to be obtained when a terminal performs coordinated scheduling in a neighboring cell. The scheduling apparatus determines whether the terminal in the neighboring cell has moved between a first region where coordinated scheduling is not performed and a second region where coordinated scheduling is performed. Next, if it is determined that the terminal in the neighboring cell has moved between the first region where coordinated scheduling is not performed and the second region where coordinated scheduling is performed, the scheduling apparatus controls the radio unit in the neighboring cell to set an Modulation and Coding Scheme (MCS) level based on the gain and perform scheduling based on the MCS level.

12 Claims, 13 Drawing Sheets

(56) References Cited

U.S. PATENT DOCUMENTS

| | | | |
|---|---|---|---|
| 2010/0091739 A1* | 4/2010 | Dayal | H04L 1/0026 |
| | | | 370/332 |
| 2010/0285810 A1 | 11/2010 | Ko et al. | |
| 2010/0322202 A1 | 12/2010 | Ohta | |
| 2011/0275397 A1 | 11/2011 | Guey et al. | |

FOREIGN PATENT DOCUMENTS

| KR | 10-2010-0108437 A | 10/2010 |
|---|---|---|
| KR | 10-2010-0118534 A | 11/2010 |
| WO | 2010/085190 A1 | 7/2010 |

* cited by examiner

METHOD AND APPARATUS FOR SCHEDULING IN WIRELESS COMMUNICATION SYSTEM FOR COORDINATED SCHEDULING

CROSS REFERENCE TO RELATED APPLICATIONS

This application is a National Stage Patent Application of PCT International Patent Application No. PCT/KR2012/009196 (filed on Nov. 2, 2012) under 35 U.S.C. §371, which claims priority to Korean Patent Application Nos. 10-2012-0015028 (filed on Feb. 14, 2012) and 10-2012-0048809 (filed on May 8, 2012), the teachings of which are incorporated herein in their entireties by reference.

TECHNICAL FIELD

The present invention relates to a method and apparatus for scheduling in a wireless communication system configured for coordinated scheduling.

BACKGROUND ART

In wireless communication systems, fading occurs according to location of a terminal or obstacles. Due to such fading, channel conditions vary in wireless communication systems. In order to improve overall system performance, resources are efficiently allocated to terminals in consideration of their channel quality indications when performing scheduling for the terminals.

For example, a wireless communication system selects a proper Modulation and Coding Scheme (hereinafter, referred to as "MCS") level according to information on Channel Quality Indication (CQI) reported by a terminal after receiving a signal from a base station. For example, a low MCS level is selected for a terminal in a bad channel condition. Due to the selected low MCS level, a data transfer rate may be reduced. However, reliable transmission is guaranteed and efficient data transmission is enabled.

In a wireless communication system, resources are largely divided into frequency resources and time resources. Optimal allocation of the resources is very important to improve the performance of the wireless communication system.

FIG. 1 illustrates an example of resource allocation in an Orthogonal Frequency Division Multiplexing (OFDM) system. More specifically, FIG. 1 illustrates the allocation of frequency resources and time resources to users in a grid-like fashion.

There is a need for a method for maximizing overall network performance by minimizing inter-cell interference and increasing a resource reuse rate through common resource management between cells in a wireless communication system.

In order to maximize overall network performance, as illustrated in FIG. 2, a resource reuse method is performed in inner regions of cells for reusing the same resource. A coordinated scheduling method is performed in boundary regions of cells for using different resources.

In case of such coordinated scheduling performed in the boundary regions of the cells, the channel quality of terminals may change abruptly when the terminals travel between the inner regions and boundary regions of the cells. However, such abrupt changes are not considered to allocate MCS levels. Accordingly, efficient data transmission is not guaranteed.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a method and apparatus for scheduling in a wireless communication system for coordinated scheduling having the advantage of increasing data transmission efficiency by allocating MCS levels depending on whether coordinated scheduling is performed in a wireless communication system.

Technical Solution

An exemplary embodiment of the present invention provides a scheduling method in an apparatus of managing radio units, wherein the radio units are respectively included in a plurality of cells and each of the radio units provides a wireless communication service to terminals in a corresponding cell. The method may include: setting a gain to be obtained when a terminal performs coordinated scheduling for resources in a neighboring cell; determining whether the terminal in the neighboring cell has moved between a first region where coordinated scheduling is not performed and a second region where coordinated scheduling is performed; and when the terminal within the neighboring cell has moved between the first region where coordinated scheduling is not performed and the second region where coordinated scheduling is performed, controlling the radio unit in the neighboring cell to set an Modulation and Coding Scheme (MCS) level based on the gain and perform scheduling based on the MCS level.

In the setting of the gain, an amplitude of a reverse pilot channel signal transmitted from the terminal to a corresponding cell is set as the gain for the neighboring cell. The second region where coordinated scheduling is performed is detected by determining whether the terminal is located at a cell boundary region based on a signal received from the terminal.

In the controlling the radio unit, a new MCS level is set by adding the gain with the MCS level allocated for the first region where coordinated scheduling is not perform when the terminal is determined as being moved from the first region where coordinated scheduling is not performed to the second region whether coordinated is performed in the determining whether the terminal has moved.

In the controlling the radio unit, a new MCS level is set by subtracting the gain from the MCS level allocated for the second region where coordinated scheduling is performed when the terminal is determined as being moved from the second region where coordinated scheduling is performed to the first region where coordinated scheduling is not performed in the determining whether the terminal has moved.

Another exemplary embodiment of the present invention provides a scheduling apparatus for managing radio units, where the radio units are respectively included in a plurality of cells and each of the radio units provide a wireless communication service for terminals in a corresponding cell. The apparatus may include a receiver, a gain setter, a determiner, and a controller. The receiver may be configured to receive a signal strength value of an uplink signal from a terminal through a plurality of radio units. The gain setter may be configured to set a gain for when coordinated scheduling is performed for each cell based on the received signal strength value of the terminal received by the receiver. The determiner may be configured to determine whether the terminal has moved between a first region where coordinated scheduling is performed and a second region where coordinated scheduling is not performed, based on the signal strength value of the uplink signal of the terminal, received by the receiver. The controller may be configured to control a MCS level based on the gain set by the gain setter if the determiner determines that the terminal has moved between the first region where coordinated scheduling is performed and the second region where coordinated scheduling is not performed. The gain setter may be configured to set a signal strength value received from a neighboring cell as the gain. The signal strength value may be an amplitude of a reverse pilot channel signal transmitted from the terminal transmits to a corresponding cell.

The first region where coordinated scheduling is performed is detected by determining whether the terminal is located at a cell boundary region based on the signal strength value of the terminal.

If the terminal has moved from the second region where coordinated scheduling is not performed to the first region where coordinated scheduling is performed, the controller may control the radio unit to perform coordinated scheduling for the terminal.

If the terminal has moved from the first region where coordinated scheduling is performed to the second region where coordinated scheduling is not performed, the controller may control the radio unit not to perform coordinated scheduling for the terminal.

If the terminal has moved from the second region where coordinated scheduling is not performed to the first region where coordinated scheduling is performed, a new MCS level may be set by adding the gain to the MCS level allocated for the second region where coordinated scheduling is not performed. If the terminal has moved from the first region where coordinated scheduling is performed to the second region where coordinated scheduling is not performed, a new MCS level may be set by subtracting the gain from the MCS level allocated for the first region where coordinated scheduling is performed.

Advantageous Effects

According to the present invention, when a terminal travels from one region where coordinated scheduling is performed to the other region where the coordinated scheduling is not performed, MCS levels are allocated based on a gain obtained by performing the coordinated scheduling. Therefore, data transmission efficiency may be improved while keeping a target block error rate of the terminal within a predetermined level.

MODE FOR INVENTION

Figure 1:
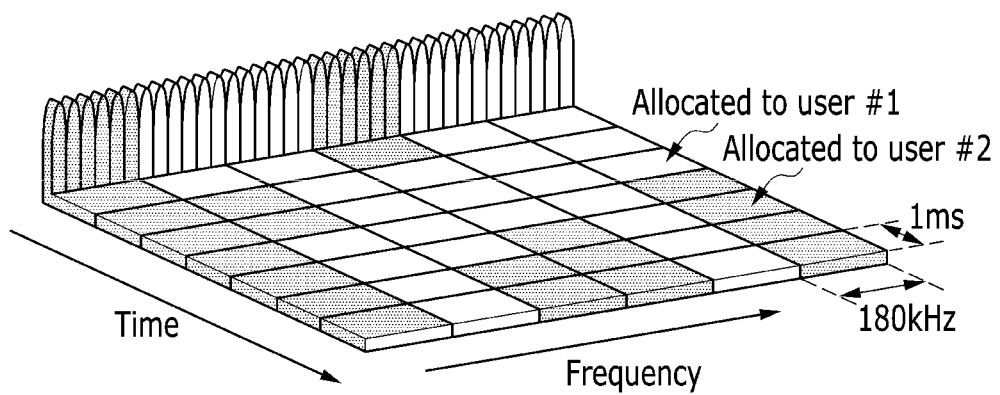
FIG. 1 illustrates an example of resource allocation in an Orthogonal Frequency Division Multiplexing (OFDM) system.
Figure 2:
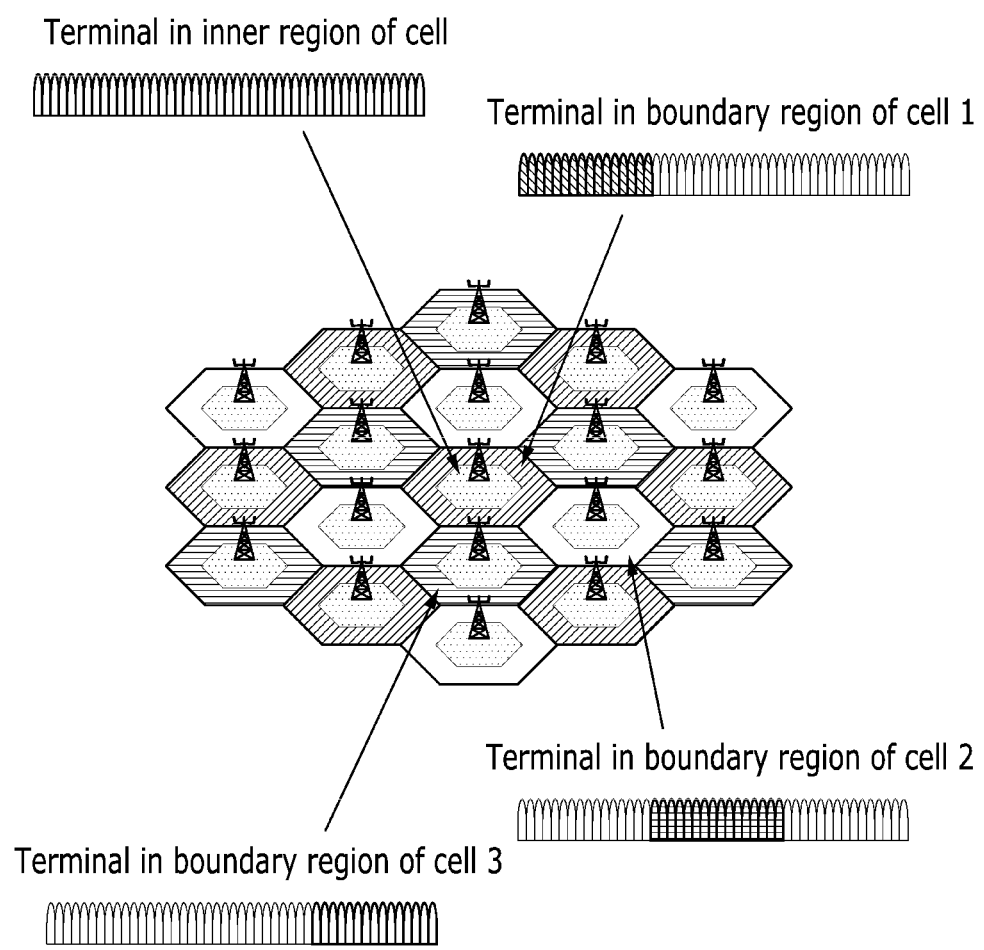
FIG. 2 is a view for describing general concept of resource allocation through coordination.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

In this specification, a terminal may designate a mobile station (MS), a mobile terminal (MT), a subscriber station (SS), a portable subscriber station (PSS), user equipment (UE), an access terminal (AT), etc., and may include all or some of the functions of the terminal, the mobile station, the mobile terminal, the subscriber station, the portable subscriber station, the user equipment, the access terminal, etc.

In this specification, a base station (BS) may designate an access point (AP), a radio access station (RAS), a node B (NodeB), an evolved NodeB (eNodeB), a base transceiver station (BTS), a mobile multihop relay (MMR)-BS, etc and include all or some of the functions of the access point, the radio access station, the NodeB, the eNodeB, the base transceiver station, the MMR-BS, etc.

Hereinafter, a method and apparatus for scheduling according to an exemplary embodiment of the present invention will be described in detail with reference to the accompanying drawings.

Figure 3:
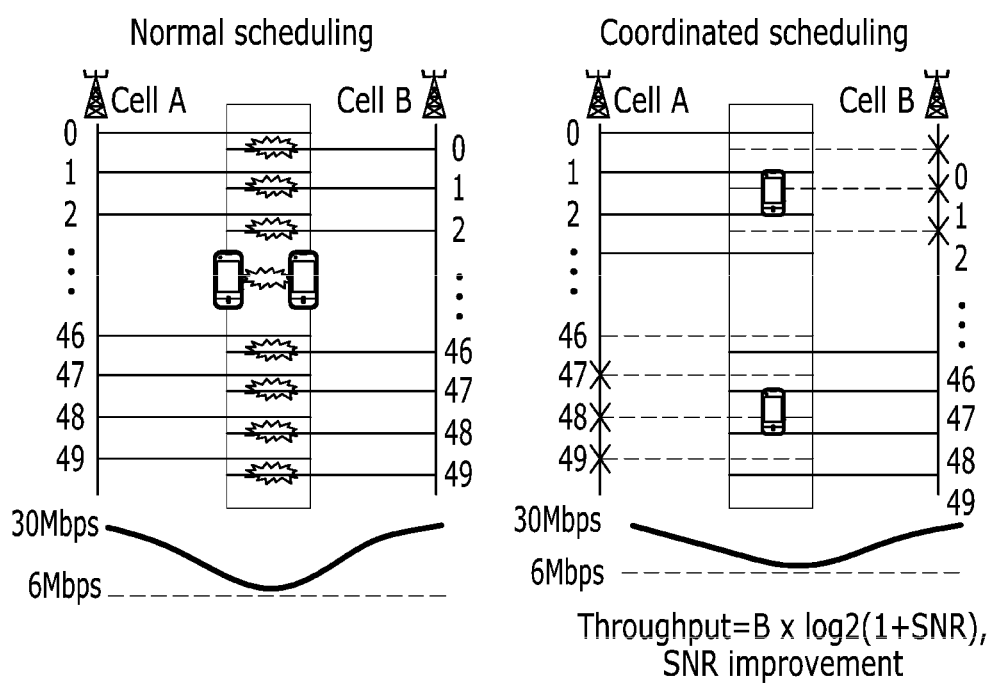
FIG. 3 is a view for comparing resource allocation through normal scheduling and resource allocation through coordinated scheduling in a wireless communication system.

FIG. 3 is a view for comparing resource allocation through normal scheduling and resource allocation through coordinated scheduling in a wireless communication system.

Referring to FIG. 3, in the normal scheduling, terminals are allowed to use all resources at a boundary region of a cell A and a cell B. Thus, data transmit rates in the boundary region have decreased due to interference as shown in FIG. 3.

On the other hand, in the coordinated scheduling, resources are allocated to terminals in the boundary region of the cell A and the cell B to use different channels. Thus, no interference occurs between the terminals. As a result, channel condition becomes better and data transmit rates also increase.

Figure 4:
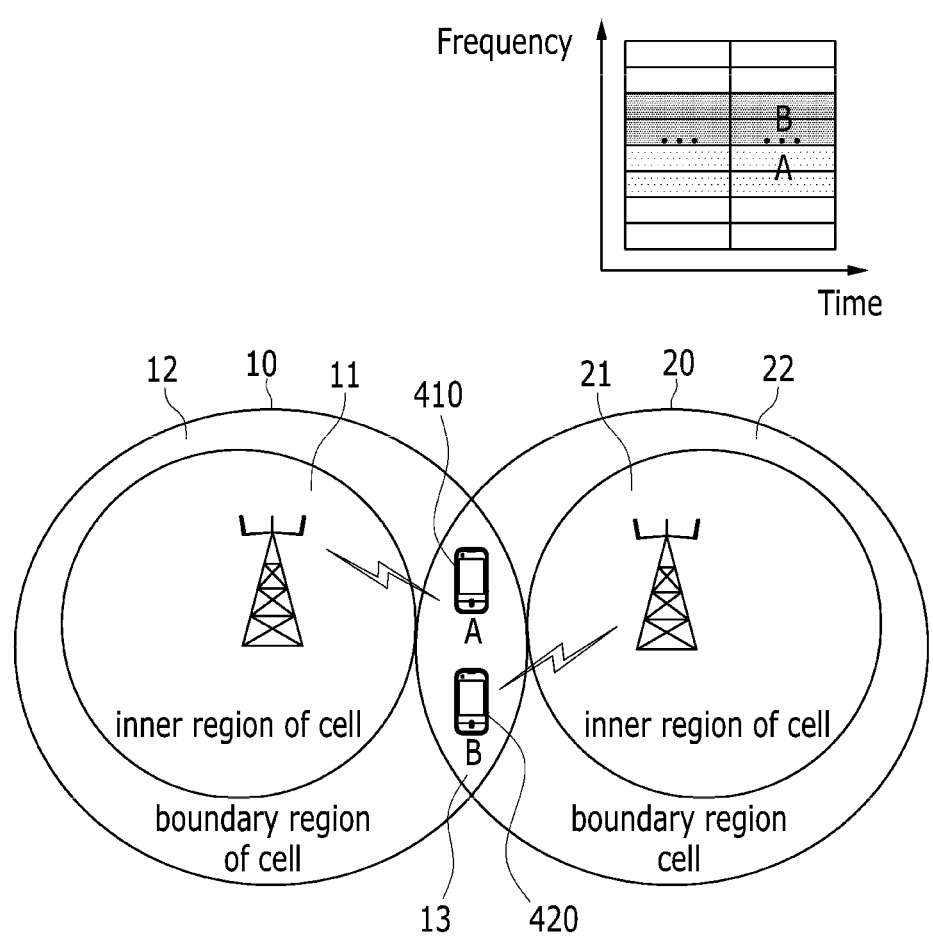
FIG. 4 illustrates an example of allocating frequency resources to terminals at a boundary region of cells through coordinated scheduling in a wireless communication system.

FIG. 4 illustrates an example of allocating frequency resources to terminals at a cell boundary through coordinated scheduling.

Referring to FIG. 4, different resources are allocated to a terminal A 410 and a terminal B 420 in a boundary region 13 of two cells 10 and 20 through coordinated scheduling. No interference occurs between the terminal A 410 and the terminal B 420. Thus, the channel conditions of the terminals become better and the data transmit rates are improved.

Figure 5:
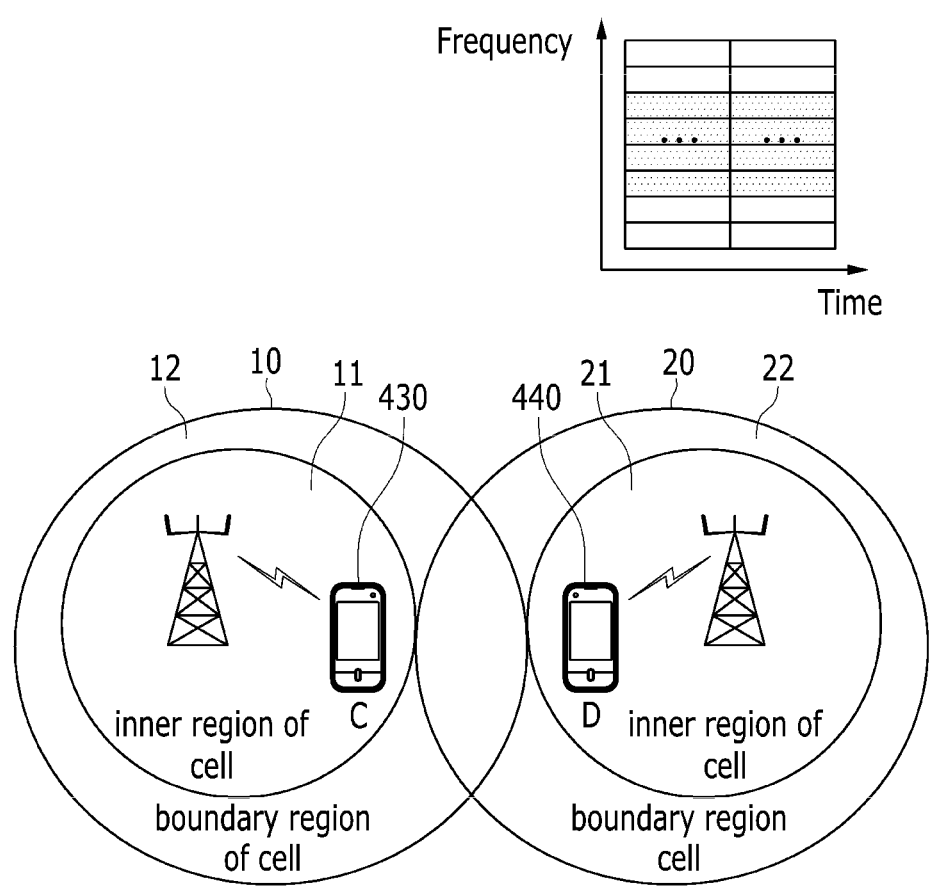
FIG. 5 is a view for describing concept of resource allocation to terminals located in inner regions of cells in a wireless communication system.

On the other hand, the same resource is allocated to a terminal C 430 and a terminal D 440 in inner regions 11 and 21 of the two cells 10 and 20 in order to reuse resources, as illustrated in FIG. 5. Accordingly, a frequency reuse rate is improved.

Meanwhile, the terminals report CQI available for the terminals, which includes 16 CQI levels in a range of 0 to 15 while keeping a target block error rate (BLER) within a certain value, e.g., 10%, as shown in Table 1 below. If a CQI level is comparatively low, a low MCS level is allocated to a terminal since channel quality is not good. In contrast, if a CQI level is comparatively high, a high MCS level is allocated because channel quality is good.

TABLE 1

| CQI index | modulation | code rate × 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3233 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

As shown in Table 2 below, a related standard defines 29 MCS levels from 0 to 28. One of the 29 MCS levels may be allocated according to a corresponding CQI level. In Table 2, Modulation Order '2' denotes Quadrature Phase Shift Keying (QPSK), Modulation Order '4' denotes Quadrature Amplitude Modulation (16QAM), and Modulation Order '6' denotes 64QAM.

TABLE 2

| MCS Index | Modulation Order |
|---|---|
| 0 | 2 |
| 1 | 2 |
| 2 | 2 |
| 3 | 2 |
| 4 | 2 |
| 5 | 2 |
| 6 | 2 |
| 7 | 2 |
| 8 | 2 |
| 9 | 2 |
| 10 | 2 |
| 11 | 4 |
| 12 | 4 |
| 13 | 4 |
| 14 | 4 |
| 15 | 4 |
| 16 | 4 |
| 17 | 4 |
| 18 | 4 |
| 19 | 4 |
| 20 | 4 |
| 21 | 6 |
| 22 | 6 |
| 23 | 6 |
| 24 | 6 |
| 25 | 6 |
| 26 | 6 |
| 27 | 6 |
| 28 | 6 |

Figure 6:
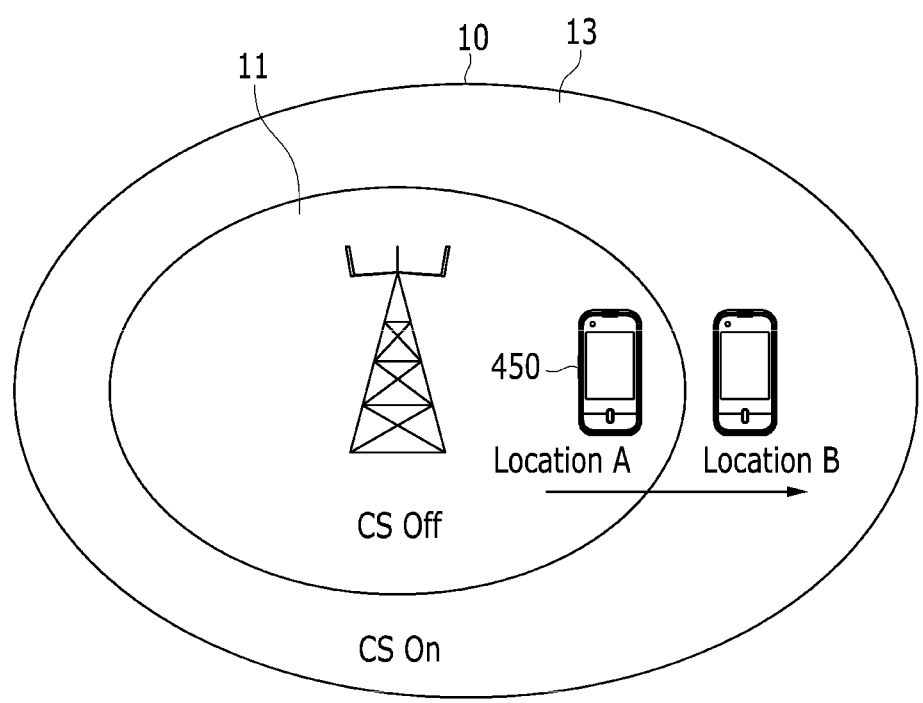
FIG. 6 illustrates an example of a terminal traveling from one region where coordinated scheduling is not performed to the other region where coordinated scheduling is performed according to an exemplary embodiment of the present invention.

As illustrated in FIG. 6, when a terminal 450 moves from location A where coordinated scheduling is not performed (CS Off) to location B where coordinated scheduling is performed (CS On), the terminal 450 in the location B may report a very high CQI level because of the coordinated scheduling. Accordingly, a very high MCS level should be selected according to the reported very high CQI level. However, in order to keep a target block error rate within a predetermined value, such as 10%, it is not proper to increase a MCS level abruptly. Accordingly, MCS levels are not properly allocated although channel quality is significantly improved by the coordinated scheduling.

Figure 7:
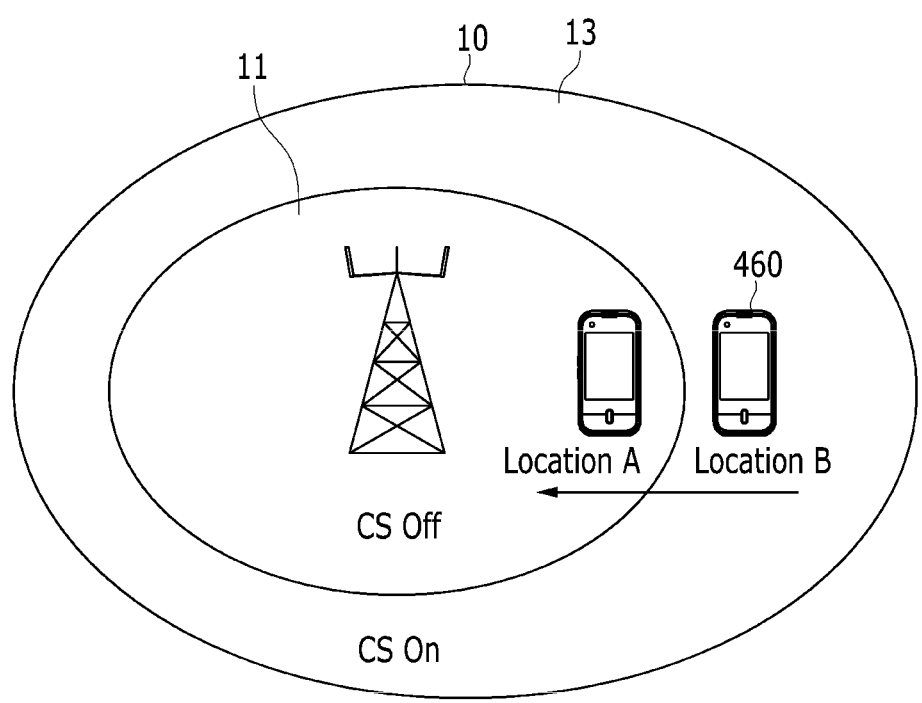
FIG. 7 illustrates an example of a terminal traveling from one region where coordinated scheduling is performed to the other region where coordinated scheduling is not performed according to an exemplary embodiment of the present invention.

In contrast, as illustrated in FIG. 7, when a terminal 460 moves from location B where coordinated scheduling is performed (CS On) to location A where coordinated scheduling is not performed (CS Off), the terminal 460 may report a very low CQI level because the coordinated scheduling is not performed in the location A. Accordingly, a very low MCS level should be selected according to the reported very low CQI level. However, in order to keep the target block error rate within a predetermined value, such as 10%, it is not proper to drop a MCS index abruptly. Accordingly, MCS levels are not properly allocated although channel quality is significantly deteriorated because of not performing the coordinated scheduling.

Hereinafter, a method and apparatus for scheduling according to an exemplary embodiment of the present invention will be described.

Figure 8:
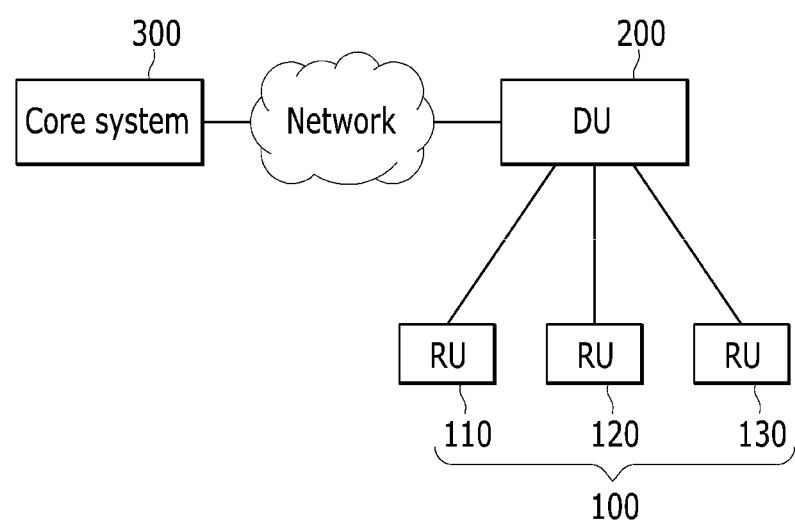
FIG. 8 is a schematic block diagram of a network according to an exemplary embodiment of the present invention.

FIG. 8 is a schematic block diagram of a network according to an exemplary embodiment of the present invention.

Referring to FIG. 8, a network according to an exemplary embodiment of the present invention includes radio units (RU) 100, a digital unit (DU) 200, and a core system 300. The radio units 100 and the digital unit 200 constitute a signal processing system for wireless communication.

The radio units 100 are parts for processing radio signals. The radio units 100 receive a digital signal from the digital unit 200, convert the received digital signal into a radio frequency (RF) signal according to frequency bands, and amplify the RF signal. A plurality of radio units 100 (110, 120, and 130) are connected to the digital unit 200. Each of the radio units 100 is installed in a corresponding service area, i.e., cell. The radio units 100 and the digital unit 200 may be connected together through an optical cable.

The digital unit 200 is connected to the core system 300. The digital unit 200 encodes or decodes wireless digital signals. Unlike the radio unit 100, the digital unit 200 is not installed in a corresponding service area. The digital unit 200 is a server installed in a central control station in a centralized manner. The digital unit 200 may be referred to as a virtualized base station. The digital unit 200 sends signals to and receives signals from the plurality of radio units 100.

A typical communication base station includes processors corresponding to the radio units 100 and a processor corresponding to the digital unit 200 together in a single physical system. Such a single physical system is installed in a service area. Unlike the typical communication base station, the radio units 100 and the digital unit 200 are physically separated and only the radio unit 100 is installed in a corresponding service area in accordance with at least one embodiment.

The core system 300 handles a connection between the digital unit 200 and an external network. The core system 300 includes an exchanger (not shown).

In an exemplary embodiment of the present invention, the two radio units 110 and 120 are located in neighboring cells 10 and 20, respectively. The radio units 110 and 120 receive uplink signals from associated terminals. The radio units 110 and 120 transmit measured uplink signal strengths to the digital unit 200. Afterwards, the digital unit 200 assesses the uplink quality of terminals 450 and 460 based on the signal strengths received from the two radio units 110 and 120. Based on the assessment result, the digital unit 200 determines whether the terminals 450 and 460 are located at a boundary region 13. Based on the determination result, the digital unit 200 determines whether the terminal 450 travels from location A to location B or whether the terminal 460 travels from the location B to the location A. Accordingly, the digital unit 200 is able to perform the coordinated scheduling for the terminals located in the cell boundary region 13.

The digital unit 200 informs the radio units 110 and 120 of the movement of the terminals 450 and 460 and whether the coordinated scheduling for the terminals 450 and 460 is performed and control scheduling of the radio units 110 and 120. Such technique for assessing the uplink quality of the terminals 450 and 460 based on the signal strengths received from the two radio units 110 and 120 and determining whether the terminals 450 and 460 are located at the cell boundary region 13 based on the assessment results is well-known to those skilled in the art. Accordingly, the detailed description thereof will be omitted herein.

Figure 9:
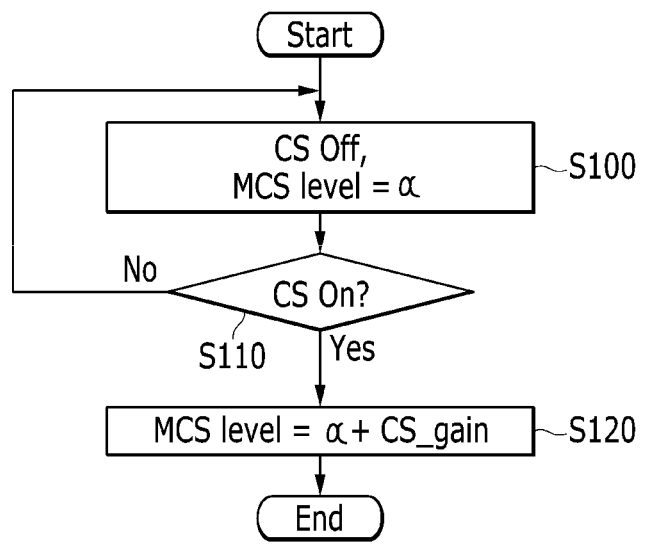
FIG. 9 is a flowchart of a method for setting an MCS level when a terminal moves from one region where coordinated scheduling is not performed to the other region where coordinated scheduling is performed according to an exemplary embodiment of the present invention.

Referring to FIG. 9, the terminal 450 is located in location A where the coordinated scheduling is not performed (CS off) as shown in FIG. 6 and is assigned with an MCS level α (S100). The terminal 450 moves from the location A to location B where the coordinated scheduling is performed (CS On) (S110). That is, the terminal 450 enters the cell boundary region 13 where the coordinated scheduling is performed. In this case, an MCS level for the terminal 450 is determined by adding a gain (CS_gain) obtained by performing the coordinated scheduling to the previous MCS level α that was previously allocated to the terminal 450 when the terminal 450 was in the location A (S120). Equation 1 below shows determination of the MCS level.

$$MCS\ level = \alpha + CS\_gain \qquad \text{[Equation 1]}$$

where α is the previous MCS level, which his previously determined before performing the coordinated scheduling.

Figure 10:
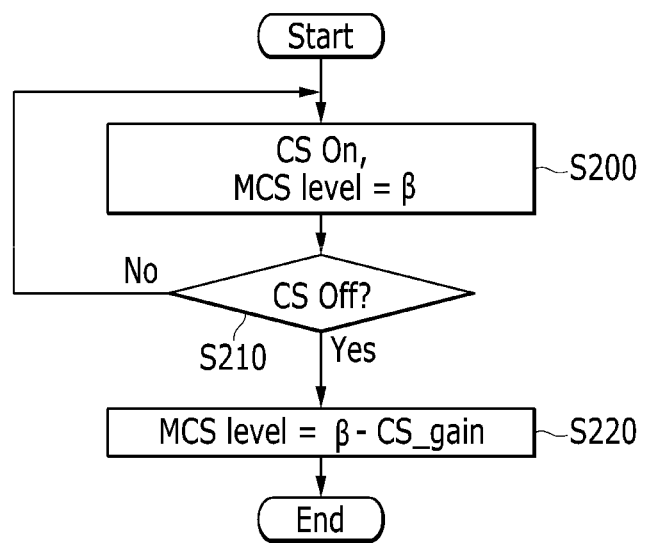
FIG. 10 is a flowchart of a method for setting an MCS level when a terminal moves from one region where coordinated scheduling is performed to the other region where coordinated scheduling is not performed according to an exemplary embodiment of the present invention.

Referring to FIG. 10, a terminal 460 is located in location B where the coordinated scheduling is performed (CS On) as shown in FIG. 7 and assigned with an MCS level β (S200). The terminal 460 moves from the location B to location A where the coordinated scheduling is not performed (CS Off) (S210). That is, the terminal 460 moves out of the cell boundary region 13 where the coordinated scheduling is performed and enters an inner region 11 of the cell (S210). In this case, an MCS level is determined by subtracting a gain (CS_gain) obtained from the performed coordinated scheduling from the previous MCS level β which was allocated to the terminal located in the location B (S220). That is, the MCS level is calculated as shown in Equation 2 below.

$$MCS\ level = \beta - CS\_gain \qquad \text{[Equation 2]}$$

where β is the previous MCS level which is previously determined during performing the coordinated scheduling.

Hereinafter, the method of calculating the gain (CS_gain) obtained from performing the coordinated scheduling will be described with reference to FIG. 11.

In this exemplary embodiment of the present invention, the gain (CS_gain) is determined based on interference level of cells adjacent to terminals 470 and 480.

Figure 11:
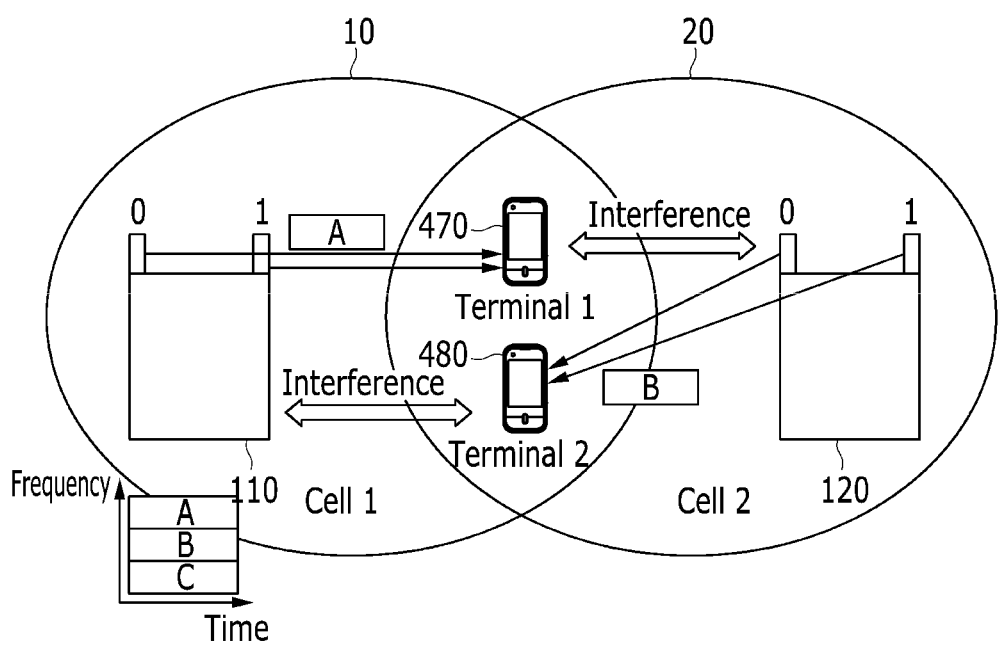
FIG. 11 is a diagram showing a gain obtained by performing coordinated scheduling according to an exemplary embodiment of the present invention.

Referring to FIG. 11, a terminal 1 (470) has interference when the coordinated scheduling is not performed in a cell 2 (20). However, such interference disappears if the coordinated scheduling is performed in the cell 2 (20).

Accordingly, the radio unit 110 measures an interference level of the terminal 1 (470) using an amplitude of a reverse pilot channel signal (sounding reference signal) transmitted to a radio unit 120 from the terminal 2 (480).

Likewise, the radio unit 120 measures an interference level of the terminal 2 (480) using an amplitude of a reverse pilot channel signal (sounding reference signal) transmitted to the radio unit 110 from the terminal 1 (470). When a neighboring cell detects a reverse pilot channel signal having a high amplitude, the neighboring cell is significantly interfered. In this case, such interference can be avoided by performing the coordinated scheduling. Hence, a high CS_gain should be applied to determine a MCS level. In contrast, if the coordinated scheduling is not performed while the CS_gain remains high, a high level of interference occurs. Hence, a high CS_gain should be subtracted.

Figure 12:
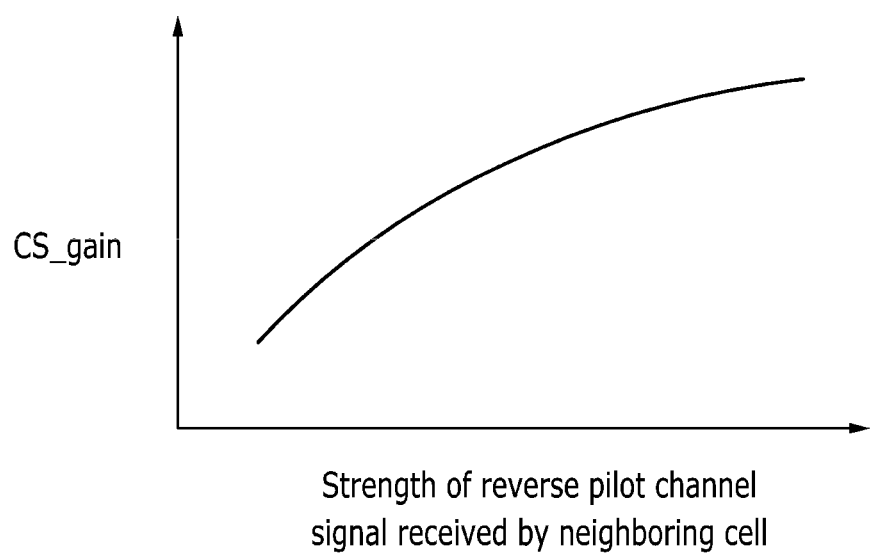
FIG. 12 is a graph of gain versus strength of a reverse pilot channel signal received at a neighboring cell according to an exemplary embodiment of the present invention.

As shown in FIG. 12, a CS_gain value is determined to be higher as the amplitude of the reverse pilot channel signal become higher when the coordinated scheduling is not performed.

Hereinafter, the digital unit 200 according to the exemplary embodiment of the present invention will be described with reference to FIG. 13.

Figure 13:
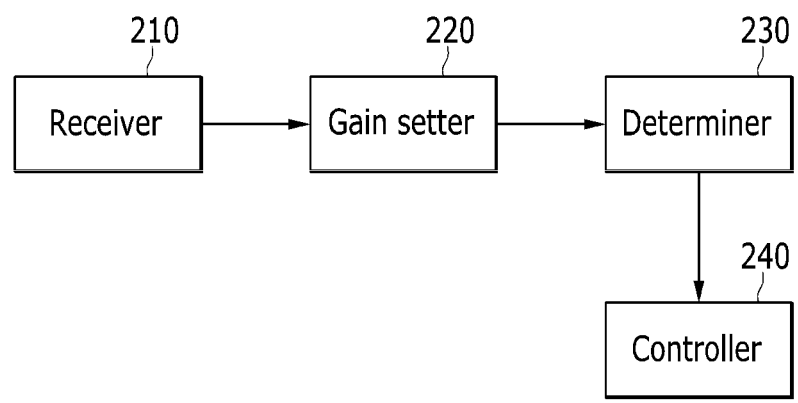
FIG. 13 is a block diagram illustrating a digital unit according to an exemplary embodiment of the present invention.

FIG. 13 is a block diagram illustrating a digital unit 200 according to an exemplary embodiment of the present invention.

Referring to FIG. 13, the digital unit 200 includes a receiver 210, a gain setter 220, a determiner 230, and a controller 240.

The receiver 210 receives information on uplink signal strengths from the radio units 110 and 120. The uplink signal strengths may be measured based on signals received from individual terminals.

The gain setter 220 receives the information on the uplink signal strengths from the radio units 110 and 120 included in cells 10 and 20 and sets the received uplink signal strengths as gains for the cells. For example, the cells 10 and 20 are adjacent to each other. The uplink signal strength received from the radio unit 110 is set as a gain for the cell 20. The uplink signal strength received from the radio unit 120 is set as a gain for the cell 10.

The determiner 230 determines whether a terminal is located in an inner region of a cell or in a cell boundary region of cells, based on the signal strength of the terminal received by the receiver 210. Based on the values, the determiner 230 determines whether a terminal has moved from the inner region of a cell to the boundary region of cells or has moved from the cell boundary region to the inner region of a cell. That is, it is possible to determine whether a terminal has moved from location A where coordinated scheduling is not performed to location B where the coordinated scheduling is performed or vice versa.

If the determiner 230 determines that a terminal has moved between one region where the coordinated scheduling is performed and the other region where the coordinated scheduling is not performed, the controller 240 transmits information about whether the coordinated scheduling is performed based upon the movement of the terminal to the radio unit 110 or 120, together with the gains set by the gain setter 220, so as to control the radio unit 110 or 120 to perform or not to perform the coordinated scheduling based upon the movement of the terminal and to allocate the optimum MCS level based upon the movement of the terminal.

That is, the controller 240 controls the radio units 110 and 120 to allocate an MCS level according to Equation 1 when a terminal moves from one region where the coordinated scheduling is not performed to the other region where the coordinated scheduling is performed and to allocate an MCS level according to Equation 2 when a terminal moves from one region where the coordinated scheduling is performed to the other region where the coordinated scheduling is not performed.

In this way, when a terminal moves between one region where the coordinated scheduling is not performed and the other region where the coordinated scheduling is performed, MCS levels are allocated based on the gain obtained from the coordinated scheduling. Therefore, data transmission efficiency can be improved while keeping the target block error rate of the terminal within a predetermined level.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A scheduling method in an apparatus of managing radio units, the method comprising:
   setting, by the apparatus, a gain to be obtained when a terminal performs coordinated scheduling for resources in a neighboring cell, wherein the apparatus is physically separated from the radio units, the radio units are respectively included in a plurality of cells, and each of the radio units provides a wireless communication service to terminals in a corresponding cell in cooperation with the apparatus;
   determining, by the apparatus, whether the terminal in the neighboring cell has moved between a first region where coordinated scheduling is not performed and a second region where coordinated scheduling is performed; and
   when the terminal within the neighboring cell has moved between the first region where coordinated scheduling is not performed and the second region where coordinated scheduling is performed, controlling, by the apparatus, the radio unit separated from the apparatus and located in the neighboring cell to set a Modulation and Coding Scheme (MCS) level based on the gain and perform scheduling based on the MCS level.

2. The method of claim 1, wherein, the gain is determined based on interference from an adjacent cell to the terminal, which have disappeared by performing coordinated scheduling, and
   in the setting a gain, the gain of the terminal in the second region is set as an amplitude of a reverse pilot channel signal transmitted from other terminal in the second region to the radio unit of the other terminal.

3. The method of claim 1, wherein the second region where coordinated scheduling is performed is detected by determining whether the terminal is located at a cell boundary region based on a signal received from the terminal.

4. The method of claim 1, wherein, in the controlling the radio unit, a new MCS level is set by adding the gain with the MCS level allocated for the first region where coordinated scheduling is not perform when the terminal is determined as being moved from the first region where coordinated scheduling is not performed to the second region whether coordinated is performed in the determining whether the terminal has moved.

5. The method of claim 1, wherein, in the controlling the radio unit, a new MCS level is set by subtracting the gain from the MCS level allocated for the second region where coordinated scheduling is performed when the terminal is determined as being moved from the second region where coordinated scheduling is performed to the first region where coordinated scheduling is not performed in the determining whether the terminal has moved.

6. A scheduling apparatus for managing radio units, the scheduling apparatus comprising:
   a receiver configured to receive a signal strength value of an uplink signal from a terminal through a plurality of radio units, wherein the scheduling apparatus is physically separated from the radio units, the radio units are respectively included in a plurality of cells, and each of the radio units provide a wireless communication service for terminals in a corresponding cell in cooperation with the scheduling apparatus;
   a gain setter configured to set a gain for when coordinated scheduling is performed for each cell based on the received signal strength value of the terminal received by the receiver;
   a determiner configured to determine whether the terminal has moved between a first region where coordinated scheduling is performed and a second region where coordinated scheduling is not performed, based on the signal strength value of the uplink signal of the terminal, received by the receiver; and a controller configured to control a MCS level based on the gain set by the gain setter if the determiner determines that the terminal has moved between the first region where coordinated scheduling is performed and the second region where coordinated scheduling is not performed.

7. The apparatus of claim 6, wherein the gain is determined based on interference from an adjacent cell to the terminal, which have disappeared by performing coordinated scheduling, and the gain setter is configured to set an amplitude of a reverse pilot channel signal transmitted from other terminal in the second region to the radio unit of the other terminal as the gain of the terminal in the second region.

8. The apparatus of claim 6, wherein the first region where coordinated scheduling is performed is detected by determining whether the terminal is located at a cell boundary region based on the signal strength value of the terminal.

9. The apparatus of claim 6, wherein, if the terminal has moved from the second region where coordinated scheduling is not performed to the first region where coordinated scheduling is performed, the controller controls the radio unit to perform coordinated scheduling for the terminal.

10. The apparatus of claim 9, wherein if the terminal has moved from the second region where coordinated scheduling is not performed to the first region where coordinated scheduling is performed, a new MCS level is set by adding the gain to the MCS level allocated for the second region where coordinated scheduling is not performed.

11. The apparatus of claim 6, wherein, if the terminal has moved from the first region where coordinated scheduling is performed to the second region where coordinated scheduling is not performed, the controller controls the radio unit not to perform coordinated scheduling for the terminal.

12. The apparatus of claim 11, wherein, if the terminal has moved from the first region where coordinated scheduling is performed to the second region where coordinated scheduling is not performed, a new MCS level is set by subtracting the gain from the MCS level allocated for the first region where coordinated scheduling is performed.

* * * * *